United States Patent [19]
Rodi

[11] 3,883,186
[45] May 13, 1975

[54] ANTI-LOCK CONTROL SYSTEM
[75] Inventor: Anton Rodi, St. Ilgen, Germany
[73] Assignee: Teldix GmbH, Heidelberg, Germany
[22] Filed: Dec. 14, 1973
[21] Appl. No.: 424,804

[30] Foreign Application Priority Data
Dec. 23, 1972 Germany.............................. 2263284

[52] U.S. Cl. ......................... 303/21 BE; 188/181 C
[51] Int. Cl................................................ B60t 8/08
[58] Field of Search............ 188/181 C; 303/20, 21; 307/10 R, 233 B; 317/5; 324/161; 340/53, 62, 263

[56] References Cited
UNITED STATES PATENTS

| | | | |
|---|---|---|---|
| 3,245,213 | 4/1966 | Thompson et al. .............. | 303/21 EB |
| 3,535,004 | 10/1970 | Howard et al. .................. | 303/21 EB |
| 3,540,781 | 11/1970 | Okamoto et al. ................. | 303/21 BE |
| 3,583,773 | 6/1971 | Steinbrenner et al. ......... | 303/21 EB |
| 3,586,385 | 6/1971 | Florus et al. ...................... | 303/20 X |
| 3,650,575 | 3/1972 | Okamoto ..................... | 188/181 C X |
| 3,663,070 | 5/1972 | Scharlack ........................ | 303/20 X |
| 3,682,515 | 8/1972 | Packer et al. .................... | 303/21 BE |
| 3,768,873 | 10/1973 | Hirzel ............................. | 303/21 BE |
| 3,804,470 | 4/1974 | Slavin et al. .................... | 303/21 BE |

Primary Examiner—Trygve M. Blix
Assistant Examiner—Stephen G. Kunin
Attorney, Agent, or Firm—Spencer & Kaye

[57] ABSTRACT

An anti-lock control system for the wheel brakes of a vehicle over a desired speed range comprises a device for producing a reference value related to the speed of the vehicle and a value dependent on the wheel speed such that each value is formed by a constant part and a speed dependent part, with the constant part of the reference value being smaller than that of the wheel speed dependent value and when each value is plotted against speed, curves are obtained having slopes of the same sign, the curves not intersecting within the desired speed range in the absence of slip, the variation of the pressure in the associated wheel brakes being controlled when the wheel speed dependent value drops below the reference value.

3 Claims, 6 Drawing Figures

ANTI-LOCK CONTROL SYSTEM

BACKGROUND OF THE INVENTION

The invention relates to an anti-lock control system for vehicles, in which a value dependent on the wheel speed is compared with a reference value and when the value dependent on the wheel speed falls below the reference value a signal is produced to vary the brake pressure.

Such anti-lock control systems, often called slip controllers, are known, for example from German Patent No. 1 156 318 and German Laid Open Application (Offenlegungsschrift) No. 2 035 632. The reference values (here a portion of a voltage dependent on the vehicle speed) can be produced from the output of a generator, driven by either an unbraked wheel or by a braked wheel. The generator may be driven by a rotating element provided with a free-wheel mechanism. The reference value can however be obtained by means of a storage device to which is fed a voltage corresponding to the wheel speed of a controlled wheel. The storage device follows, to a large extent sufficient for practical purposes, fed-in voltage increases, but, on the other hand it follows quick voltage reductions with a predetermined delay. The reference value can, however, also be a voltage directly dependent (without storage) on the speed of a controlled vehicle wheel, with which voltage the voltage corresponding to the wheel speed of another wheel is compared.

It is known to divide the voltage thus obtained, which is at least approximately directly proportional to the vehicle speed, by means of a voltage divider and to compare a certain part thereof, for example 90 percent, with a voltage derived from the wheel speed. The divided voltage then acts as a threshold and if the voltage derived from the wheel speed passes below this threshold, that is to say a predetermined slip is present, a reduction in the brake pressure to the brakes of the associated wheel is initiated. It is recognized that the voltage differences at low speeds between the vehicle speed voltage and the reference voltage are so small that, because of the relatively low accuracy of the voltage produced by the wheel sensors, the slip controller is no longer usable. Thus the ability to switch off the controller when the speed has dropped to a predetermined low speed is required. This known solution also does not take into account the fact that the optimal amount of brake slip for best braking results is greater the smaller the vehicle speed becomes. Finally, when turning corners, which takes place at lower speeds in correspondence with the curve radius, speed differences occurring between two wheels cause the control device to respond in an incorrect manner, if the vehicle speed voltage is derived from the outer faster wheel and the other wheel is compared with vehicle speed voltage.

It is also already known to avoid these disadvantages, to extract from the voltage corresponding to the vehicle speed, e.g., by means of a diode, a constant voltage corresponding to a constant speed and to compare the remaining voltage residue with the voltage corresponding to the wheel speed.

It can be shown that the slip — as above stated — increases at low speeds, that also an improvement with regard to the response of the control device in curves takes place, but that the system already fails theoretically at low speeds, for example, below 20 km/h. In practice, this failure of the system takes place much earlier, since the reference voltage and the wheel-dependent voltages become very small at speeds in the region of 20 km/h. In addition, further difficulties are encountered since components usable for the voltage extraction have voltage values of about 0.7 V; in the case of voltage generators usual in vehicles (pulse generator with converters) which depend on operational voltage, this voltage value of 0.7 V corresponds approximately to 35 km/h.

SUMMARY OF THE INVENTION

It is an object of the invention to create a slip controller which is usable down to very low speeds, which does not respond erroneously on curves and operates in dependence on the speed such that with low speeds the permissible slip becomes greater.

According to the invention, there is provided an anti-lock control system for the wheel brakes of vehicles over a desired speed range comprising first means for producing a vehicle speed-dependent reference value having a reference value curve when plotted against a speed whose slope is of a particular sign and including a constant portion and a portion dependent on the speed of the vehicle, second means for producing a wheel speed-dependent value having a wheel speed-dependent value curve when plotted against a speed which does not intersect said reference value curve in said desired speed range when no wheel slip of an associated wheel occurs and which has a slope of the same sign as that of said reference value curve and including a constant portion larger than said constant portion of said constant portion of said reference value and a portion dependent on the speed of said associated wheel, comparison means for comparing said reference value with said wheel speed-dependent value and control means responsive to said comparison means for controlling variation of brake pressure at the wheel brake of said associated wheel when said wheel speed-dependent value falls below said reference value.

BRIEF DESCRIPTION OF THE DRAWINGS

The invention will now be described in greater detail, by way of example, with reference to the drawings, in which.

DESCRIPTION OF THE PREFERRED EMBODIMENT

In order to understand the operation of the invention, reference will first be made to the existing situation.

Figure 1:
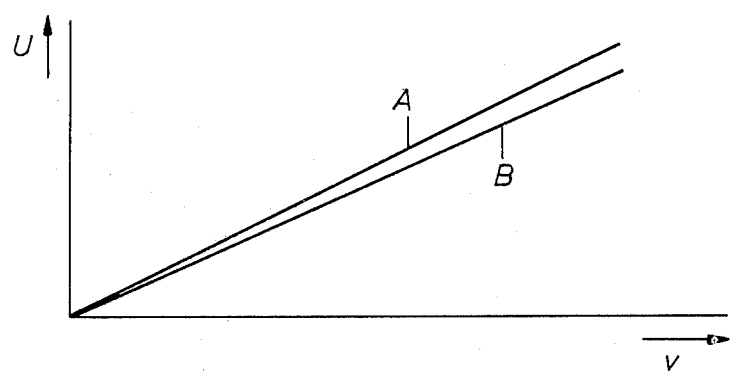
FIG. 1 is a graph showing a vehicle speed value and a first reference value derived therefrom plotted against the vehicle speed.
Figure 2:
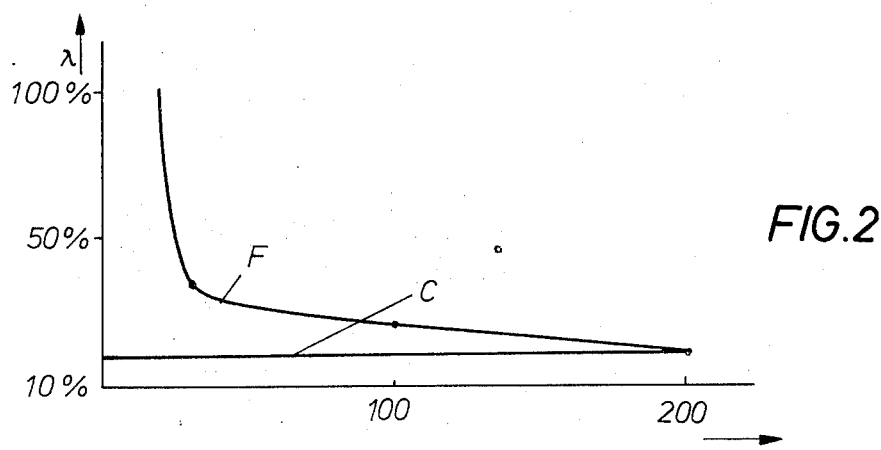
FIG. 2 is a graph showing the wheel slip as a percentage plotted against the vehicle speed for the case of FIG. 1.

To obtain a reference value from a voltage which is at least approximately proportional to the vehicle speed, it has been proposed to divide this voltage by means of a voltage divider and to compare a certain part thereof, for example 90 percent, with a voltage derived from the wheel speed. The divided voltage then acts as a threshold and if the voltage derived from the wheel speed passes below this threshold, that is to say a predetermined slip is present, a reduction in the brake pressure to the brakes of the associated wheel is initiated. FIG. 1 shows the curve A obtained by plotting the voltage corresponding to the vehicle speed against the vehicle speed. The curve B is obtained by plotting the reference voltage (90 percent of the vehicle speed voltage) against the vehicle speed. It is recognized that the voltage differences at low speeds between the vehicle speed voltage and the reference voltage are so small that because of the relatively low accuracy of the voltage produced by the wheel sensors, the slip controller is no longer usable. In curve C of FIG. 2, constant slip $\lambda$ is plotted against the vehicle speed for this case. Thus the ability to switch off the controller when the speed has dropped to a predetermined low speed is required. This previously proposed solution also does not take into account the fact that the optimal amount of brake slip for best braking results is greater the smaller the vehicle speed becomes. Finally when turning corners, which takes place at lower speeds in correspondance with the curve radius, speed differences occurring between two wheels cause the control device to respond in an incorrect manner, if the vehicle speed voltage is derived from the outer faster wheel and the other wheel is compared with the vehicle speed voltage.

Figure 3:
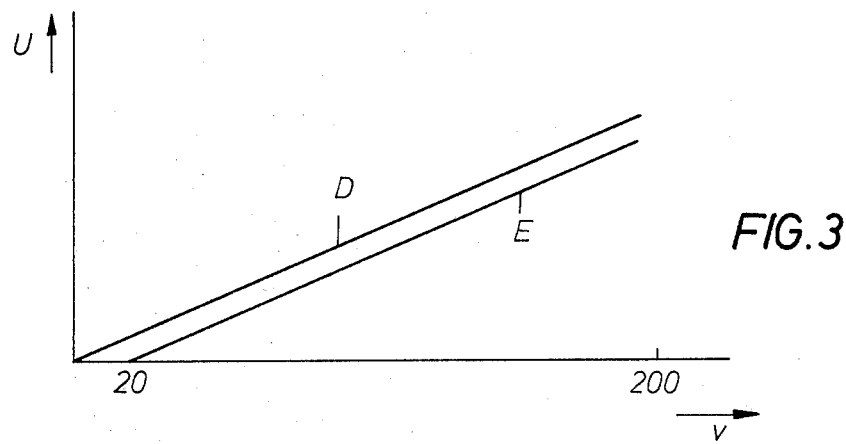
FIG. 3 is a graph showing a vehicle speed value and a second reference value related thereto plotted against the vehicle speed.

It has already been proposed to avoid these disadvantages, to extract from the voltage corresponding to the vehicle speed, e.g., by means of a diode, a constant voltage corresponding to a constant speed and to compare the remaining voltage residue with the voltage corresponding to the wheel speed. The curve of the voltage corresponding to the vehicle speed plotted against the vehicle speed for this situation is given the reference D in FIG. 3 and the curve of the comparison voltage plotted against the vehicle speed is given the reference E. This curve assumes that the slip present is 10 percent at 200 km/h. The relationship of the slip $\lambda$ to the vehicle speed gives the curve F in FIG. 2. It will be seen that the slip — as above stated — increases at low speeds, that an improvement with regard to the response of the control device in curves takes place, but that the system already fails theoretically at small speeds, for example, below 20 km/h. In practice, this failure of the system takes place much earlier, since the reference voltage and the wheel dependent voltages become very small at speeds in the region of 20 km/h. In addition, further difficulties are encountered since components usable for the voltage extraction have voltage values of about 0.7 V; in the case of voltage generators usual in vehicles (pulse generator with converters) which depend on operational voltage, this voltage of 0.7 V corresponds approximately to 35 km/h.

The invention basically proposes a system in which the reference value and the wheel speed-dependent value are made up of two parts, a constant part and a speed-dependent part, the constant part of the reference value being smaller than the constant part of the wheel speed-dependent value. The slopes of the curves formed by plotting these values against speed are of the same sign and the curves do not intersect unless wheel slip is present.

The expression "value" has been chosen in this context since although these values are often in the form of voltages, they may well be, for example, in the case of digital operation, in the form of frequencies or digital values.

In this latter situation, the formation of the values can be carried out such that the frequency of a pulse sequence which is dependent on a wheel or vehicle speed is determined by means of a counter and a constant value is added to this speed-dependent value.

In the case of both analog and digital operation, no actual constant voltage or no actual constant digital value has to be superimposed on the speed-dependent value. Rather the value added to the speed-dependent value can itself vary with the speed. However, in the end result, the final value can still be said to comprise a constant part and a speed-dependent part which has been controlled twofold.

It has been hitherto mentioned that the values should be dependent on the speed. However this does not mean that the dependency must be in any way linear, although the linear dependency is preferred. The two speed-dependent values may have different dependences from speed, for example, the constants of proportionality can be different. What is important to the operation of the invention is that the curves of the two values plotted against speed have slopes of the same sign. Thus both curves could in this way have negative slope measures, in which the values become smaller as the speed increases. In the case of proportionality it is possible, for example, when comparing the speeds of two wheels, to obtain the reference value directly from the measurement of one wheel speed (with the addition of the constant part). In the case of a linear dependency of the speed-dependent part of the final values on the wheel speed, the curves are two straight lines which cut the $y$-axis at different $y$-values and here also have a variable slope (i.e., a different proportionality factor) as, for example, shown in FIG. 4. The curve with the smallest $y$-value for $v = 0$ (curve H in FIG. 4) is used as the comparison value, the speed-dependent part of which has been obtained from sensors at a finely controlled wheel. The other curve (G in FIG. 4) shows the course of a value dependent on the speed of another wheel to be controlled in relation to its slip (without brake slip). Variation of the braking influence is effected if the value to be compared drops to the comparison value.

Figure 4:
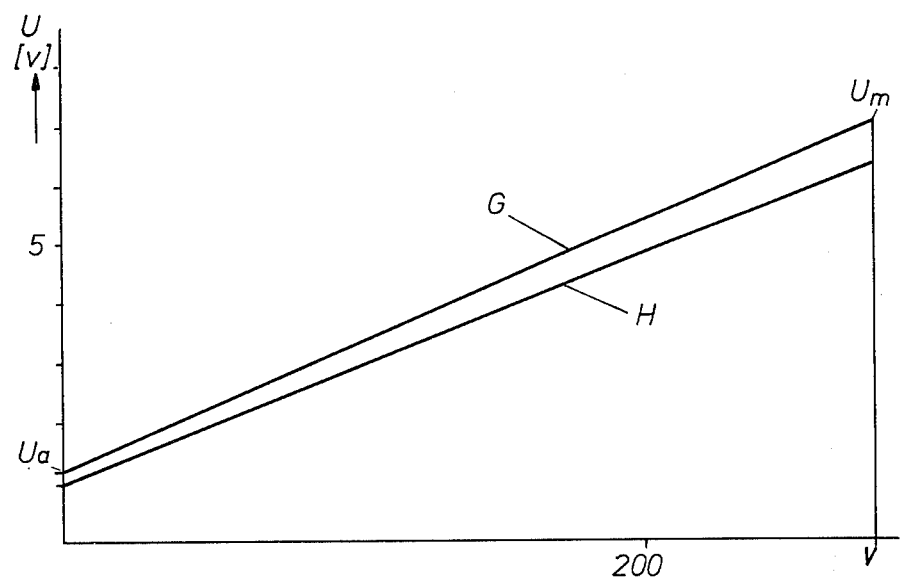
FIG. 4 is a graph showing a vehicle speed value and a third reference value related thereto plotted against the vehicle speed.

On the assumption that the comparison value and the wheel voltage-dependent value are two straight lines (as in FIG. 4), the following expression is obtained for the slip:

$$\lambda = \left(1 - \frac{m_2}{m_1}\right) - c \cdot \frac{1}{f_o/f_{gr}}$$

wherein $m_1$ represents the slope of the upper straight line (G in FIG. 4)

$m_2$ represents the slope of the lower straight line (H in FIG. 4) (reference value)

$f_o$ represents a value proportional to the speed $f_{gr}$ represents the highest possible constant value of $f_o$ $$c = \frac{U_{a2} - U_{a1}}{U_{m1} - U_{a1}}$$

$U_{a1}$ represents the constant value of the upper straight line (in the case of $v$ or $f_o = 0$)

$U_{a2}$ represents the constant value of the lower (comparison value) straight line (in the case of $v$ or $f_o = 0$)

$U_{m1}$ represents the end value of the upper straight line at $v = v_{gr}$ or $f_o = f_{gr}$ The relationship of the slopes $m_2/m_1$ may be varied only in the framework of the following expression $$|c| \leq \frac{m_2}{m_1} \leq 1 + |c|$$

so as to prevent shortening of the speed range of interest.

Figure 5:
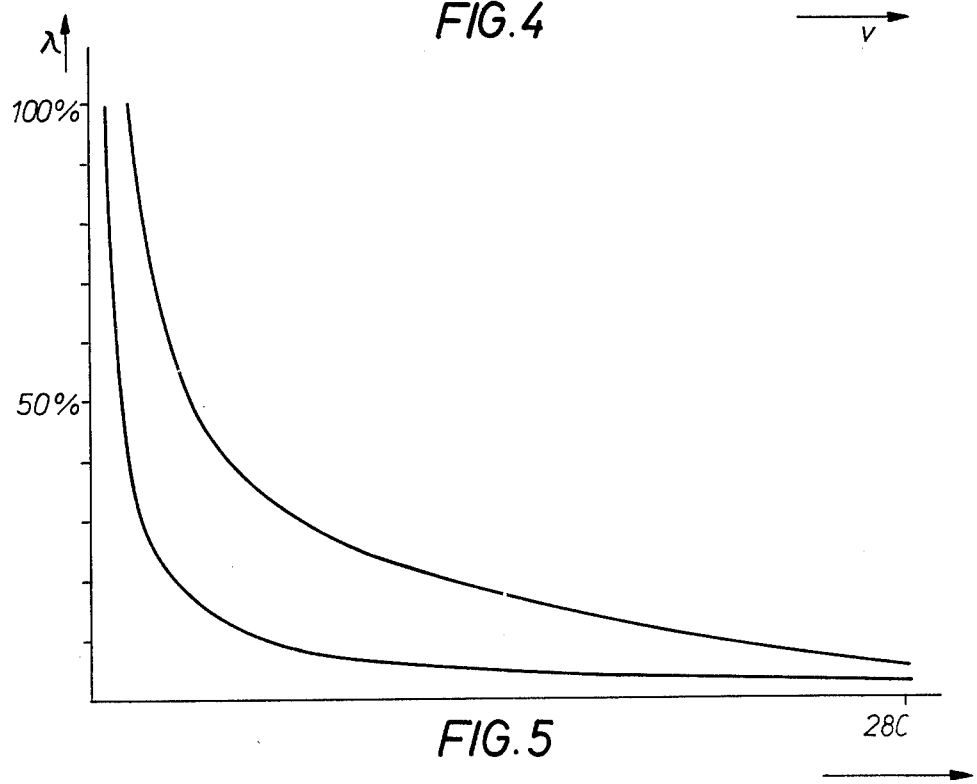
FIG. 5 is a graph showing the wheel slip as a percentage plotted against the vehicle speed and related to the graph of FIG. 4.

If starting from two such straight lines under predetermined conditions, then according to the specified formula for $\lambda$, dependencies of the slip on the speed $v$ (or $f_o$) occur, as FIG. 5 shows for two examples. The slip dependency is given by the choice of the relationship $m_2/m_1$ and by the choice of the values for $U_{a1}$ $U_{a2}$ and $U_{m2}$, i.e., the desired and required dpendency can be set by choice of these values. The curves show that the slip increases at low speed, that a slip of 100 percent can be detected and thus be effective for automatic switch-off of the controller at very low speeds and that the erroneous response when going round curves can be eliminated.

For the formation of the values for comparison, a value approximating the vehicle speed can be produced by means of a value dependent on the wheel speed, an additional memory being used in this connection in known manner. This memory is charged rapidly and thus closely follows the applied value and is discharged slowly, at least from time to time. The memory may be, for example, an RC element when the operation is in analog form, and in the case of a digital operation, the memory may be a counter, which slowly reduces its count if no greater input value is fed into it. Here a value comprising a constant portion and wheel speed-dependent portion is fed to the memory. The output value is then reduced by division to correspond to the desired slip values. This reduction could, however, take place prior to storing.

A preferred form of embodiment will now be described with reference to FIGS. 4 and 5. In this embodiment, a value proportional to the vehicle speed is superimposed on a constant value. The method obtaining the vehicle speed value is not of importance. An analog operation is considered.

FIG. 4 shows a curve G of a vehicle speed-dependent voltage plotted against the vehicle speed $v$. The superimposed direct voltage value is in this case 1.1 V. The comparison or reference voltage is obtained by a voltage divider with a division 1 : 9, i.e., 90 percent of the voltage corresponding to curve G serves as the comparison voltage. The comparison voltage is plotted against the vehicle speed in the curve H. With the values which can be assumed from FIG. 4 the slip is:

$$\lambda = (1 - x) \left[ 1 + \frac{1}{\frac{U_m}{U_a} - 1} \cdot \frac{1}{v/v_{gr}} \right]$$

In this:

$$x = \frac{R_2}{R_1 + R_2},$$

By the choice of the expression $$\frac{1}{\frac{U_m}{U_a} - 1}$$

that means the selectable values the curve $\lambda$ can be very greatly influenced. This can be seen from the two curves of $\lambda$ against the vehicle speed $v$ in FIG. 5. Thus matching to various controllers and the taking into account of various control prerequisites is possible with the teaching in accordance with the invention.

It will be seen from FIG. 5 that an operation of the controller down to low speeds is possible, in which, selecting the slip value of 100 percent an automatic switch-off can be achieved at a selectable low speed of, for example, 3.5 km/h. Moreover the erroneous response of the controller on curves can be avoided by the choice of the curve parameters. Also the desirable feature of automatically increasing the permissable slip towards low speeds is also achieved.

Still further, by the selection of the data to which the comparison voltage is related (e.g. by additional switching in of a diode), the curve of the comparison voltage can be influenced. With the presence of a corresponding current supply, the addition of the constant voltage value can be undertaken such that the speed-dependent values which have passed the zero point are related to a reference point of another polarity (for example a positive voltage dependent on the speed may be related to a negative reference value).

Figure 6:
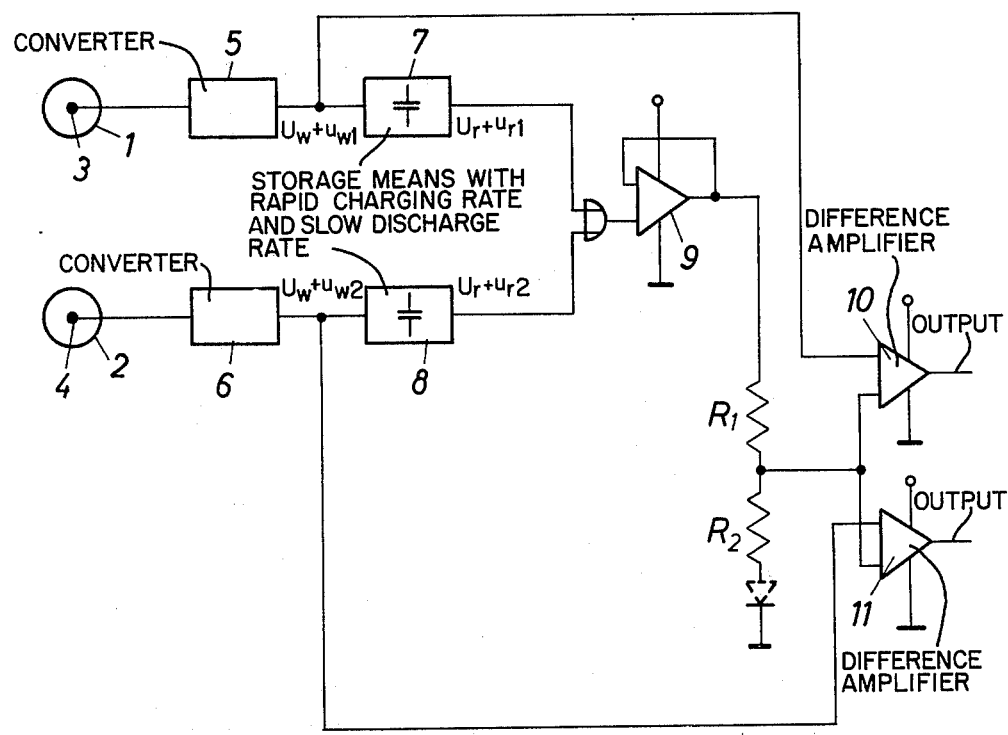
FIG. 6 is a diagrammatic representation of one form of apparatus for carrying out the invention.

FIG. 6 shows schematically a part of one example of an anti-locking controller in accordance with the invention. Here, two vehicle wheels 1 and 2 are shown connected to two pulse generating sensors 3 and 4, which each produce a pulse sequence proportional in frequency to the rotary speed of the wheels. These pulses are fed to frequency/voltage converters 5 and 6, in which a direct current voltage, dependent on the wheel speed is produced from the pulse sequence in each case. These converters 5 and 6 are so designed that the voltages present at the output of the frequency/voltage converter are made up of a desired constant voltage part and a voltage part proportional to the wheel speed, i.e., they correspond to the curve G of FIG. 4. Thus, for example, the converter 5 has an output signal (that is, a wheel speed-dependent value) composed of $U_w + u_{w1}$, where $U_w$ is a constant value portion and $u_{w1}$ is a value portion dependent upon the speed of the wheel 1. At the same time, the converter 6 has an output signal (that is, a wheel speed-dependent value) composed of $U_w + u_{w2}$, where $u_{w2}$ is a value portion dependent upon the speed of the wheel 2. The output voltages of the converters 5 and 6 are fed, respectively to storage elements 7 and 8 whose charging states follow the voltages fed in from the converters without delay. However, these storage elements are discharged in a delayed manner at least from time to time. Thus, a voltage, whose curve with respect to time approximates the vehicle speed, appears at the output of the storage circuits in known manner. However, upon these voltages a further direct current voltage is superimposed. Thus, for example, the storage element 7 has an output signal (that is, a vehicle speed-dependent reference value) composed of $U_r + u_{r1}$, where $U_r$ is a constant value portion and $u_{r1}$ is a value portion dependent upon the vehicle speed derived from the speed of the wheel 1. At the same time, the storage element 8 has an output signal (that is, a vehicle speed-dependent reference value) composed of $U_r + u_{r2}$, where $u_{r2}$ is a value portion dependent upon the vehicle speed derived from the speed of the wheel 2. For a better approximation of the curve to the course of vehicle speed, two storage elements are provided and a selection element in the form of an operational amplifier 9 selects from the storage element outputs the output with the greater voltage. The voltage at the output of the selection element 9 corresponds to the curve G in FIG. 4. This voltage is reduced by means of a voltage divider comprising resistances $R_1$ and $R_2$. The reduced voltage (H in FIG. 4) is fed to the lower inputs of difference amplifiers 10 and 11. The comparison or reference voltage fed in the difference amplifiers 10 and 11 can be further subjected to a diode (shown in broken lines) for shifting of the reference point. The comparison or reference voltage is compared with the output voltages of the converters 5 and 6 and, when these output voltages fall below the comparison or reference voltage, switching voltages are produced at the outputs of the difference amplifiers which serve to control the brake pressure at the associated wheels.

The superimposition of a direct voltage on to the speed dependent voltages in the converters 5 and 6 does not entail any difficulties. Rather, such a superimposition follows automatically with suitable design of the converters, since the output voltage of a converter always deviates from its supply voltage by a constant amount.

It will be understood that the above description of the present invention is susceptible to various modifications changes and adaptations.

What is claimed is:

1. An anti-lock control system for the wheel brakes of vehicles over a desired speed range, comprising:
   a. first means for generating vehicle speed-dependent reference values each composed of a constant value portion and a vehicle speed-dependent value portion and forming, when plotted against vehicle speed, a reference value curve having a slope of a particular sign;
   b. second means for generating wheel speed-dependent values as a function of the speed of a given wheel of the vehicle, each wheel speed-dependent value being composed of a constant value portion larger than said constant value portion of the vehicle speed-dependent reference values and a value portion dependent upon the speed of said given wheel, said wheel speed-dependent values forming, when plotted against vehicle speed, a wheel speed-dependent value curve having the same sign as said reference value curve and not intersecting said reference value curve in said desired speed range in the absence of slip of said given wheel;
   c. comparison means for comparing said reference values with said wheel speed-dependent values; and
   d. control means responsive to said comparison means for varying the brake pressure at the wheel brake of said given wheel when the wheel speed-dependent value falls below the reference value.

2. A system as defined in claim 1, wherein said first means includes storage means having a rapid charging rate and a slow discharge rate, said storage means being connected to said second means for receiving from said second means signals having said wheel speed-dependent values.

3. A system as defined in claim 1, wherein said first means for generating said reference values and said second means for generating said wheel speed-dependent values include means for providing said speed-dependent value portions in linear dependence on the wheel speed.

* * * * *

UNITED STATES PATENT OFFICE
CERTIFICATE OF CORRECTION

PATENT NO. : 3,883,186
DATED : May 13th, 1975
INVENTOR(S) : Anton Rodi

It is certified that error appears in the above-identified patent and that said Letters Patent are hereby corrected as shown below:

In the heading of the patent, under [73] Assignee, change "Teldix" to --TELDIX--.

Column 3, line 60, after "on" insert --the--.

Column 6, line 6, after "In this:" insert --

$x = \dfrac{R_2}{R_1 + R_2}$ wherein $R_1$ and $R_2$ are the resistances of the voltage divider and the comparison or reference voltage is tapped at $R_2$;

$u_m$ = the maximal value of the voltage corresponding to the vehicle speed at the highest vehicle speed (here 280 km/h);

$U_a$ = the output value of the voltage corresponding to the vehicle speed at the speed 0, that is to say the superimposed, constant voltage;

$v$ = the vehicle speed;

$v_{gr}$ = the maximal speed for which the controller is designed (here 280 km/h).--

Signed and Sealed this thirtieth Day of September 1975

[SEAL]

Attest:

RUTH C. MASON
*Attesting Officer*

C. MARSHALL DANN
*Commissioner of Patents and Trademarks*